July 19, 1949.　　　A. W. GARDINER　　　2,476,410
TORQUE METER
Original Filed Dec. 21, 1942
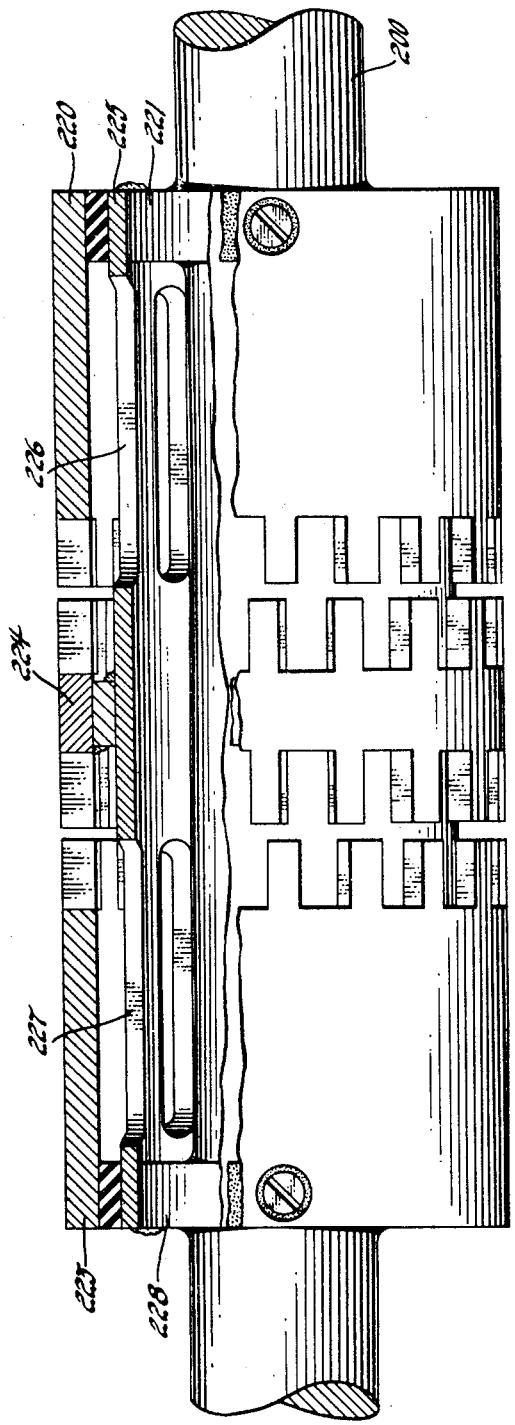
INVENTOR
Arthur W. Gardiner
BY
Blackmore, Spencer & Flint
ATTORNEY Patented July 19, 1949

2,476,410

UNITED STATES PATENT OFFICE 2,476,410

TORQUE METER

Arthur W. Gardiner, Indianapolis, Ind., assignor to General Motors Corporation, Detroit, Mich., a corporation of Delaware Original application December 21, 1942, Serial No. 469,622. Divided and this application June 24, 1944, Serial No. 541,881

3 Claims. (Cl. 73—136)

This invention relates to means for indicating torque or load on a member and particularly to means for measuring the torque or load on a rotating shaft and is a division of Serial No. 469,622, filed December 21, 1942, entitled Torque meter in the names of A. W. Gardiner and John L. Goldthwaite, which application matured into Patent 2,397,935 on April 9, 1945. It has been recognized that there are a number of instances in which it would be very desirable to be able to read the amount of load or torque which a particular rotatable shaft is transmitting at a given moment. This is particularly true in aircraft where it would be very advantageous for the pilot to be able to read on an indicating dial the load or power output on the shaft of any one of the motors on the plane. If such devices were provided, then the pilot could set the throttles and fuel flow rates to the engines so that they would develop maximum efficiency or economy of operation and therefore give the greatest distance possible on his fuel.

It is, of course, known that by applying a torque load to a rotatable shaft there occurs a certain amount of twist or wind-up in the shaft due to said load and that this wind-up is substantially proportional to the load. Thus by supporting separate means at a plurality of axially spaced points on a torque-carrying shaft and bringing the supported means into juxta-position, there will be a slight relative motion therebetween upon a torque load application to the shaft and effects may be obtained from this relative motion which will vary electrical characteristics to give a desired indication. The pieces in juxta-position may, for example, form an electrical condenser and as such when the members are moved relatively the electrical capacity therebetween will be changed and this capacity variation can, through other apparatus, give a desired indication. This is mentioned only as an illustration as a variation in other electrical characteristics may also be utilized.

It is therefore an object of my invention to provide means for indicating the torque produced in a rotatable shaft.

It is a further object of my invention to provide a torque-indicating mechanism which may be applied to the torque-carrying member with substantially no change in the construction of the member.

It is a still further object of my invention to provide a torque-indicating mechanism in which special means are provided to stabilize the mechanical positioning of parts in a manner to inhibit motion therebetween other than the motion due to torsional deflection accompanying application of the torque to be measured.

It is a still further object of my invention to provide a torque-indicating mechanism in which special provision is made to compensate for error factors by rendering the mechanism insensitive to factors other than torsional deflection of parts occasioned by application of the torque to be measured.

It is a still further object of my invention to provide mounting means for a compensated torque meter pick-up mechanism.

With these and other objects in view which will become apparent as the specification proceeds, the embodiments of my invention will be best understood by reference to the following specification and claims, and the illustrations in the accompanying drawings, in which:

The figure is a front elevation of a pick-up means according to the invention with parts broken away and shown in section.

In this figure, 200 represents the shaft to which torque is applied and in which it is desirable to be able to obtain an indication for measure. Rigidly secured upon this shaft in spaced relation are two axially spaced supports 221 and 228. These supports may be rigidly attached to the shaft by welding or other similar means.

A flexible tube or sleeve 225 extends between the axially spaced supports 221 and 228 and has therein longitudinally extending slots 226 and 227 to weaken the same. Upon the central portion of this sleeve 225 is mounted in spaced relation a concentric central collar 224 having serrated toothed edges extending axially in opposite directions. Insulatably mounted on the opposite ends of the cylindrical member 225 are two collars or cylinders 220 and 223 extending axially toward the central collar 224 and having at their approaching ends serrations adapted to cooperate with the toothed portions of the member 224 and form therewith electrical condensers. Thus when torque is applied to the shaft 200, a certain windup or twist in said shaft will occur between the points of connection of supports 221 and 228 which will be directly imparted to the concentric sleeve 225. The amount of relative rotation is substantially one-half between either end and the central collar 224 and therefore the amount of relative movement between the two sets of teeth will be substantially equal.

Since the members 220 and 223 are insulated from the shaft they may be connected to a suitable bridge indicating circuit and the capacities formed between the two sets of teeth may form adjacent bridge arms. Thus, by proper connection to an electrical bridge, the capacities of the two condenser pairs can be added, whatever the initial spaced relationship of the mating end faces of the teeth. But, for the specific purpose of obtaining compensation as later described, it is proposed to position the teeth initially as shown so that the wind-up in the shaft will produce like capacity changes in the two condenser pairs, but of opposite sign. This arrangement provides error compensation by virtue of the use in each of the oppositely varying double condensers where each condenser pair receives one-half of the total deflection of the shaft. The auxiliary support sleeve 225 which spans the full length gage of the shaft between the flanges and supports midway of its length the central toothed collar drum 224 is rendered torsionally weak by means of the aforementioned axial slots, thus reducing its torgue-carrying capacity to but a very small fractional portion of the capacity of the shaft. In consequence, torsional deflection is maintained at near maximum value and stress in the fastenings between sleeve 225 and the supports of shaft 200 is held at a minimum. It will be obvious that upon torque application to the shaft the anchorage points of sleeve 225 will move in unison with the shaft supports and that the midpoint which supports toothed collar 224 will be rotated through an angle substantially one-half the amount of relative angular movement between the shaft supports. Thus, there is provided in the three-element double condenser arrangement the equivalent of a third point of attachment to the shaft without the actual need for such a physical connection. This simplifies the assembly and has very obvious structural advantages in many instances such, for instance, as shown in the figure where the pick-up mechanism spans a shaft between supports, or again, for instance, in cases where a third point of support would cause damage to a shaft surface.

There are, of course, certain error factors which may cause unwanted changes in the capacity of the condenser pairs thus giving rise to a false indication of torque. For instance, mechanical positioning of parts forming a condenser pair may be altered by factors other than torque deflection in the shaft, such as by differential expansion or contraction of parts, stray parasitic deflection of condenser parts due to bending of the torque-carrying shaft. Also, condenser capacity per se may be altered by factors causing change in dielectric strength of the space between mating condenser parts, such as by change in air density, temperature or in the amount of oil or oil vapor in this space.

To mitigate the effect of these error factors, compensation is provided by using multiple condenser pairs so arranged in juxtaposition in a common environment and so disposed and connected to the electrical bridge that a change in torsional deflection causes a change in electrical capacity of approximately like amount, but of opposite sign, in each of the two condenser pairs, whereas a change due to error factors causes a change in capacity of approximately like amount and of like sign in each of the two condenser pairs. Connections to the bridge are such that the effect of capacity changes of opposite sign is additive, whereas changes of like sign tend to be nullified. By maintaining two condenser pairs closely and symmetrically spaced in a common environment, change in dielectric of the space between mating parts will, to a high order of probability and barring the chance selective introduction of some disturbing foreign particle into one of the pairs only, affect each pair a like amount, or, if the effect on each pair is not of like amount, the net effect appearing as an error in the torque indication is only that due to the differential of the individual effects. By maintaining the two condenser pairs closely and symmetrically disposed in the same environment, stray deflections or differential expansions will, to a high order of probability, occur equally in each and again, if not equal, the error effect is differential. The likelihood of error factors causing an important parasitic deflection in a torsional sense is very remote.

It is therefore seen that I have provided means whose electrical characteristics are altered by relative mechanical movement, the same provided by the twist between spaced portions in a rotatable member and such change being proportional to the load applied to the rotatable member.

I claim:

1. In means for detecting torsional stress in a rotating body, a circular support on said body, a collar mounted on the support and electrically insulated therefrom having a series of teeth, a second axially spaced circular support mounted on the body, a second collar on said support insulated therefrom and having similar teeth, a hollow flexible tube extending between the two supports and supported by them in uninsulated relation spaced from the body, and a member mounted upon the tube between the collars having teeth cooperating with the teeth on both collars to form condensers for indicating purposes.

2. In means for detecting torsional stress in a rotating body, a plurality of axially spaced supports rigidly secured to the body, a sleeve carried at its ends only by the supports, said sleeve having weakening openings therein so that its strength in torsion will be materially less than that of the rotating body, at least three axially spaced collar means mounted on said sleeve and extending toward each other having toothed adjacent spaced ends, alternate collars being electrically insulated from the sleeve and forming with the others condenser means so that relative rotative movement of the teeth caused by torsional stress in the body and sleeve will provide proportional capacity change.

3. In means for detecting torsional stress in a rotating body, a plurality of axially spaced supporting rings rigidly secured to the body, a sleeve mounted at its ends only on and extending between said rings having longitudinal slots therein to weaken the same and at least three axially spaced collars mounted on said sleeve and having toothed portions projecting toward each other but spaced, alternate collars being electrically insulated from the sleeve, adjacent teeth forming an electrical condenser so that twist in the sleeve caused by torgue in the shaft will provide relative rotation and a proportional capacity change.

ARTHUR W. GARDINER.

REFERENCES CITED

The following references are of record in the file of this patent:

UNITED STATES PATENTS

| Number | Name | Date |
|---|---|---|
| 932,111 | Fessenden | Aug. 24, 1909 |
| 1,938,349 | Norton | Dec. 5, 1933 |
| 1,946,099 | Norton | Feb. 6, 1934 |
| 1,986,406 | Norton | Jan. 1, 1935 |
| 2,260,036 | Kuehni | Oct. 21, 1941 |
| 2,349,653 | Godsey | May 23, 1944 |
| 2,354,129 | Langer | July 18, 1944 |
| 2,354,130 | Langer et al. | July 18, 1944 |
| 2,365,564 | Langer | Dec. 19, 1944 |
| 2,367,017 | Gardiner | Jan. 9, 1945 |

FOREIGN PATENTS

| Number | Country | Date |
|---|---|---|
| 470,454 | Germany | Jan. 15, 1929 |
| 482,081 | Great Britain | Mar. 23, 1938 |